(12) United States Patent
Walker

(10) Patent No.: US 10,870,029 B1
(45) Date of Patent: Dec. 22, 2020

(54) HIGH PRESSURE HOSE NOZZLE TEST SYSTEM WITH TRAILER HITCH

(71) Applicant: FlowHitch, LLC, Birmingham, AL (US)

(72) Inventor: Travis D. Walker, Birmingham, AL (US)

(73) Assignee: FlowHitch, LLC, Birmingham, AL (US)

(*) Notice: Subject to any disclaimer, the term of this patent is extended or adjusted under 35 U.S.C. 154(b) by 93 days.

(21) Appl. No.: 15/923,756

(22) Filed: Mar. 16, 2018

Related U.S. Application Data

(60) Provisional application No. 62/486,049, filed on Apr. 17, 2017.

(51) Int. Cl.
| | | |
|---|---|---|
| A62C 37/50 | (2006.01) | |
| B60D 1/66 | (2006.01) | |
| B60D 1/42 | (2006.01) | |
| B65H 75/42 | (2006.01) | |
| B05B 15/62 | (2018.01) | |
| B05B 15/60 | (2018.01) | |
| B60D 1/40 | (2006.01) | |

(52) U.S. Cl.
CPC .............. *A62C 37/50* (2013.01); *B05B 15/62* (2018.02); *B60D 1/42* (2013.01); *B60D 1/665* (2013.01); *B65H 75/425* (2013.01); *B05B 15/60* (2018.02); *B60D 1/40* (2013.01); *B65H 2701/33* (2013.01)

(58) Field of Classification Search
CPC ....... A62C 37/50; A62C 31/005; A62C 31/24; B05B 15/62; B05B 15/60; B60D 1/42; B60D 1/44; B60D 1/665; B65H 75/426; B65H 2701/33

USPC ................ 169/62; 239/722; 280/476.1, 504; 224/502, 504, 519–521, 282, 924
See application file for complete search history.

(56) References Cited

U.S. PATENT DOCUMENTS

| | | | | |
|---|---|---|---|---|
| 5,297,736 | A * | 3/1994 | Vickery | ................. A62C 37/50 239/122 |
| 5,775,560 | A * | 7/1998 | Zahn | ......................... B60R 9/06 224/485 |
| 5,804,716 | A | 9/1998 | McGuire et al. | |
| 6,095,429 | A | 8/2000 | Killgrove et al. | |
| 6,314,891 | B1 | 11/2001 | Larson | |

(Continued)

FOREIGN PATENT DOCUMENTS

WO 2008110150 A1 9/2008

*Primary Examiner* — Joseph A Greenlund
(74) *Attorney, Agent, or Firm* — Bush Intellectual Property Law; Kenneth M. Bush

(57) ABSTRACT

A hose nozzle test system having a housing with a plurality of hose nozzles therein. The housing has a first side for attachment of hoses to the hose nozzles and a second opposite side has openings which allow tips of the hose nozzles to extend out of the housing for the discharge of water. A diffuser may be attached rotatably to the second opposite side, allowing the diffuser to open and close to access the interior of the diffuser. A first portion of a trailer hitch is attached at a front end of the housing and a second portion of the trailer hitch is attached rotatably to the first portion so that the system can be rotated vertically for transportation by a vehicle or by an attachable wheel. The system is small, portable, stable, easy to use and maintain, and a user has control over where discharge water is flowing.

18 Claims, 12 Drawing Sheets

(56) References Cited

U.S. PATENT DOCUMENTS

| | | | | |
|---|---|---|---|---|
| 6,386,049 | B1* | 5/2002 | Schrumm | A62C 37/50 |
| | | | | 73/861.66 |
| 6,761,135 | B1* | 7/2004 | Becktold | B08B 3/026 |
| | | | | 122/396 |
| 7,017,406 | B1* | 3/2006 | Cressman | F04B 51/00 |
| | | | | 73/168 |
| 7,137,568 | B1* | 11/2006 | LaCrosse | B05B 1/267 |
| | | | | 239/1 |
| 7,827,860 | B2* | 11/2010 | Weis | F04D 15/0088 |
| | | | | 73/168 |
| 8,302,470 | B2* | 11/2012 | Earle | A62C 27/00 |
| | | | | 73/198 |
| 8,554,497 | B2 | 10/2013 | Hamilton et al. | |
| 9,890,056 | B2* | 2/2018 | Havi | C02F 1/283 |
| 9,975,525 | B2* | 5/2018 | Arakelian | B60S 9/18 |
| 10,151,539 | B2* | 12/2018 | Kamps | F28D 7/00 |
| 10,434,346 | B1* | 10/2019 | Weis | A62C 31/05 |
| 2005/0056435 | A1* | 3/2005 | Price | A62C 27/00 |
| | | | | 169/52 |
| 2006/0240392 | A1* | 10/2006 | Clifton | G09B 19/00 |
| | | | | 434/226 |
| 2009/0248324 | A1* | 10/2009 | Hamilton | G01M 3/2846 |
| | | | | 702/47 |
| 2010/0163123 | A1* | 7/2010 | Earle | A62C 27/00 |
| | | | | 137/557 |
| 2010/0270041 | A1* | 10/2010 | Groonwald | A62C 27/00 |
| | | | | 169/52 |
| 2011/0266009 | A1* | 11/2011 | Liu | A62C 27/00 |
| | | | | 169/52 |
| 2012/0261903 | A1* | 10/2012 | Arakelian | B60D 1/665 |
| | | | | 280/476.1 |
| 2013/0022434 | A1* | 1/2013 | Uttech | B66F 9/065 |
| | | | | 414/495 |
| 2013/0221127 | A1* | 8/2013 | Tamaki | B41J 2/16585 |
| | | | | 239/124 |
| 2014/0265251 | A1* | 9/2014 | Schwarz | B60D 1/52 |
| | | | | 280/504 |
| 2015/0231430 | A1* | 8/2015 | Cook | A62C 31/005 |
| | | | | 169/24 |
| 2018/0282108 | A1* | 10/2018 | Russell | B65H 75/4486 |

* cited by examiner

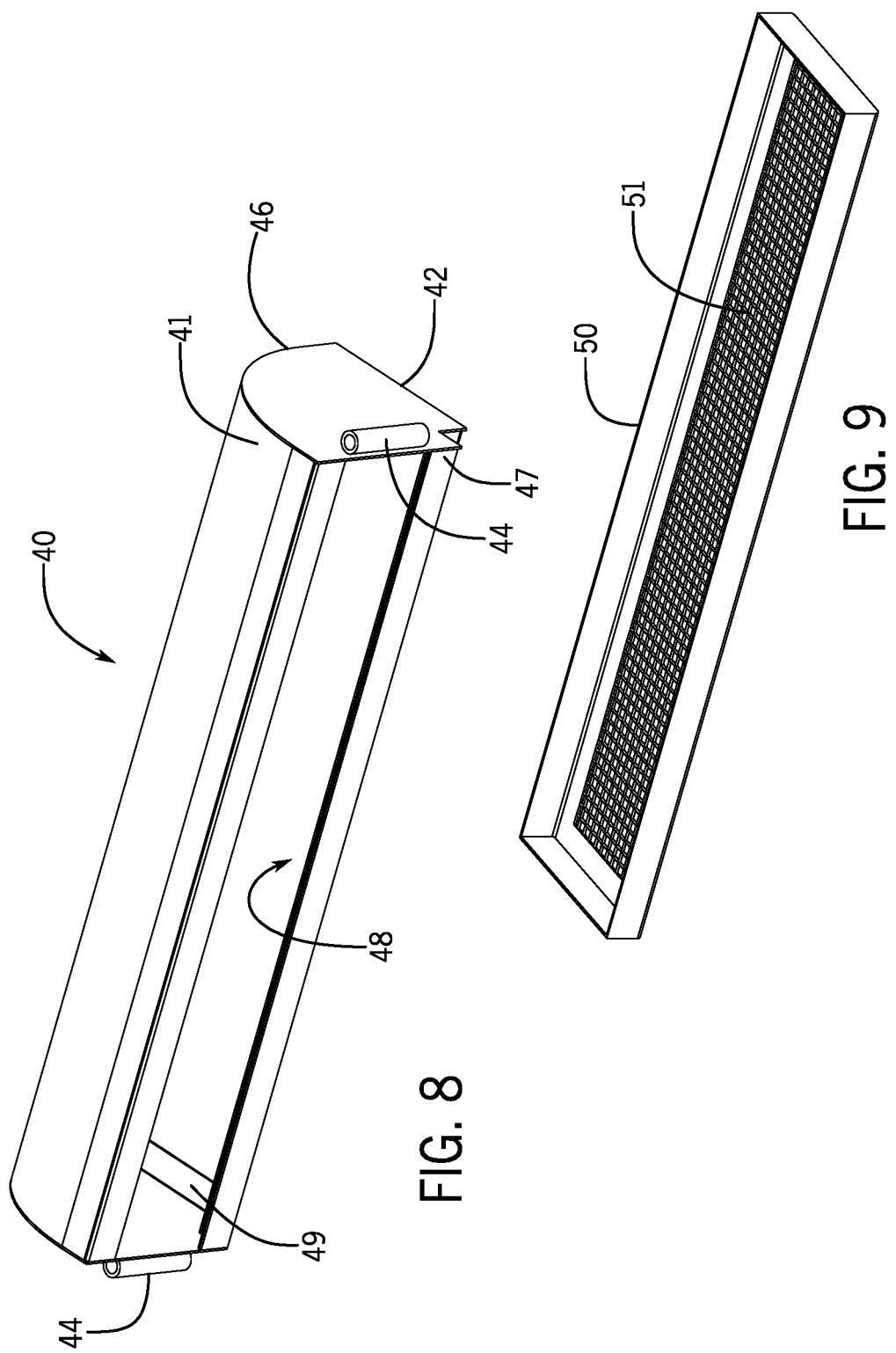

HIGH PRESSURE HOSE NOZZLE TEST SYSTEM WITH TRAILER HITCH

CROSS-REFERENCE TO RELATED APPLICATIONS

The present application claims priority to U.S. Provisional Patent Application No. 62/486,049, filed Apr. 17, 2017, which is incorporated herein by reference in its entirety.

FIELD OF THE INVENTION

The present invention is directed to equipment for testing high pressure water systems and, more particularly, to portable equipment for testing high pressure fire suppression systems.

BACKGROUND OF THE INVENTION

It is necessary to test the water pressure in fire suppression systems periodically to meet fire and safety codes. The National Fire Protection Association (NFPA) code requires field testing of each new pump and annual testing of existing pumps. Under supervision of local building and fire authorities, the pumps are tested with full water flow to verify that the pump, the supply piping, and the water source meet the design demand of the fire suppression system of the building.

To test a typical system, the sprinkler system or standpipe is usually connected to a hose and a playpipe to allow the free flow of high pressure water through the system and out the playpipe. Typically, temporary hoses are attached to an available connection and the water is released. A playpipe or flow diverter may be connected to the end of the hose to allow flow measurements at the exiting water stream. A measuring device, such as a pitot tube, determines the flow of water exiting the hose/playpipe. During pressure tests, water may be allowed to discharge from these systems for anywhere from just a few minutes to 30 minutes or more.

The water discharged from the playpipe typically cannot be directed with any great specificity or accuracy to a particular area, but instead flows primarily outdoors in the immediate vicinity of the building that contains the system under test. The water is often discharged adjacent to the building wall or hydrant. Additionally, when water under high pressure is released to atmospheric pressure, considerable forces are in play on the discharge stream. High pressure water spraying from the hose releases very strong forces that are difficult to control and tend to cause the hose and playpipe to swing from side to side and whip violently. Typically, the playpipe or flow diverter needs to be restrained during testing. In addition, extreme care must be exercised with regard to where the water is discharged. The high pressure water from the playpipe may dig holes in streets, driveways, parking lots, and lawns, with results very similar to hydraulic mining. Damage to the ground, surrounding landscaping, and harm to individuals in the path of the water can occur due to a misdirected water stream.

A fire protection technician will perform a fire pump flow test on a commercial property by flowing water from the fire pump to an area outside of the building housing the pump. During the time the water flows, the technician measures the amount of water that passes through each hose nozzle (e.g. gallons per minute). Another test that a fire protection technician will perform is a five-year system flow and internal inspection of the fire sprinkler system. Another test performed by a fire protection technician is to flow the water from a private service fire hydrant. If the hydrant is located next to a road, a building, or a parking lot, it is important to protect property and people by focusing the high pressure water discharge away from any cars or buildings near the fire hydrant. All of these tests are required by the NFPA inspection and testing standards.

Current equipment commonly used in the fire protection industry to flow water at a high rate of pressure is the Hose Monster® product provided by Hydro Products Flow, Inc. (Lake Zurich, Ill.). A problem with devices such as these is that they must be transported by hand and they are large and heavy to move. Further, they are susceptible to moving around or "walking" when exposed to high pressure water flow. As a consequence, high pressure water flow goes into unwanted places since these products sit directly on the ground and are not designed to be attached or secured to something heavy to hold them in place. A technician, thus, does not have complete control over where the discharge water is flowing. The Hose Monster® testing process exposes the technician to becoming soaking wet due to the lack of control over the Hose Monster® device. Having the hoses on the ground also makes it difficult to take the various measurements needed, especially when trying to capture sediment.

U.S. Pat. No. 6,095,429 describes a high pressure water flow diffuser and housing mounted on a trailer for attachment to vehicles to address the problems associated with testing high pressure water. The housing diverts water to the street. U.S. Pat. No. 8,302,470 describes a flow test device for diminishing and diverting the flow of a high pressure stream of water while testing a fire pump. The device has a hollow diverter tank supported on a trailer for receiving a high pressure stream of water forced by the fire pump through one or more pipes and nozzle tips retained in a stable position adjacent the diverter tank. Diffusers within the tank divert the flow of water as it enters the tank with the water subsequently exiting through an open bottom of the diverter tank. However, these diverters and diffusers are bulky, heavy, have complex designs, and need to be mounted on a trailer.

What is needed is a high pressure water diverter and diffuser test system that is small in size, portable, stable, and easy to orient for the diversion of high pressure water flow.

SUMMARY OF THE INVENTION

The hose nozzle test system of the present invention has a housing having a plurality of hose nozzles therein. The housing has a first side with openings for attachment of hoses to the hose nozzles and a second opposite side with openings which allow tips of the hose nozzles to extend out of the housing for the discharge of water. The second opposite side can also have hinges with pins and a diffuser attached thereto for collection of sediment. If a pin is removed from one hinge the diffuser can be rotated away from the second opposite side with the other hinge. This feature allows easy access to the interior of the diffuser. The housing preferably also has a hose reel attached to the housing, a supplemental hose nozzle housing attachment, and a storage compartment.

A trailer hitch is positioned on a front end of the housing. The trailer hitch has a first portion attached to the front end of the housing and has a second portion attached rotatably to the first portion with a hinge pin. The hinge pin is fixed to the first portion. This configuration allows the first portion to rotate vertically relative to the horizontal second portion.

The first portion of the trailer hitch is attached rotatably to the front end of the housing to allow the housing to rotate around its central axis.

The first portion of the trailer hitch has a wheel mounting bracket and can be rotated vertically and locked into a vertical position. This configuration allows the hose nozzle test system to be transported in a vertical position at the back of a vehicle. One or more wheels having a wheel connecting bracket are attachable to the wheel mounting bracket so that the hose nozzle test system can be moved manually to a desired location.

An advantage of the present invention is a hose nozzle test system small in size, portable, stable, and easy to use and maintain.

Another advantage is that a user has complete control over where the discharge water is flowing.

Another advantage is a locking mechanism that locks the hose nozzle test system in a vertical position so that it is parallel to the rear end of a vehicle (e.g. truck tailgate) when not in use or when traveling.

Another advantage is a swivel connection that allows the hose nozzle test system to rotate and lock into place, allowing the user to direct the flow of water in a desired direction for the best drainage with less damage to surrounding property.

These and other features and advantages of the invention will become apparent from the following detailed description of the invention.

BRIEF DESCRIPTION OF THE DRAWINGS

FIG. 8 shows a high pressure water flow diffuser configured for attachment to the housing of the hose nozzle system.

FIG. 9 shows a perspective view of a containment member configured for placement in an interior of the high pressure water flow diffuser.

DETAILED DESCRIPTION OF THE INVENTION

Figure 1:
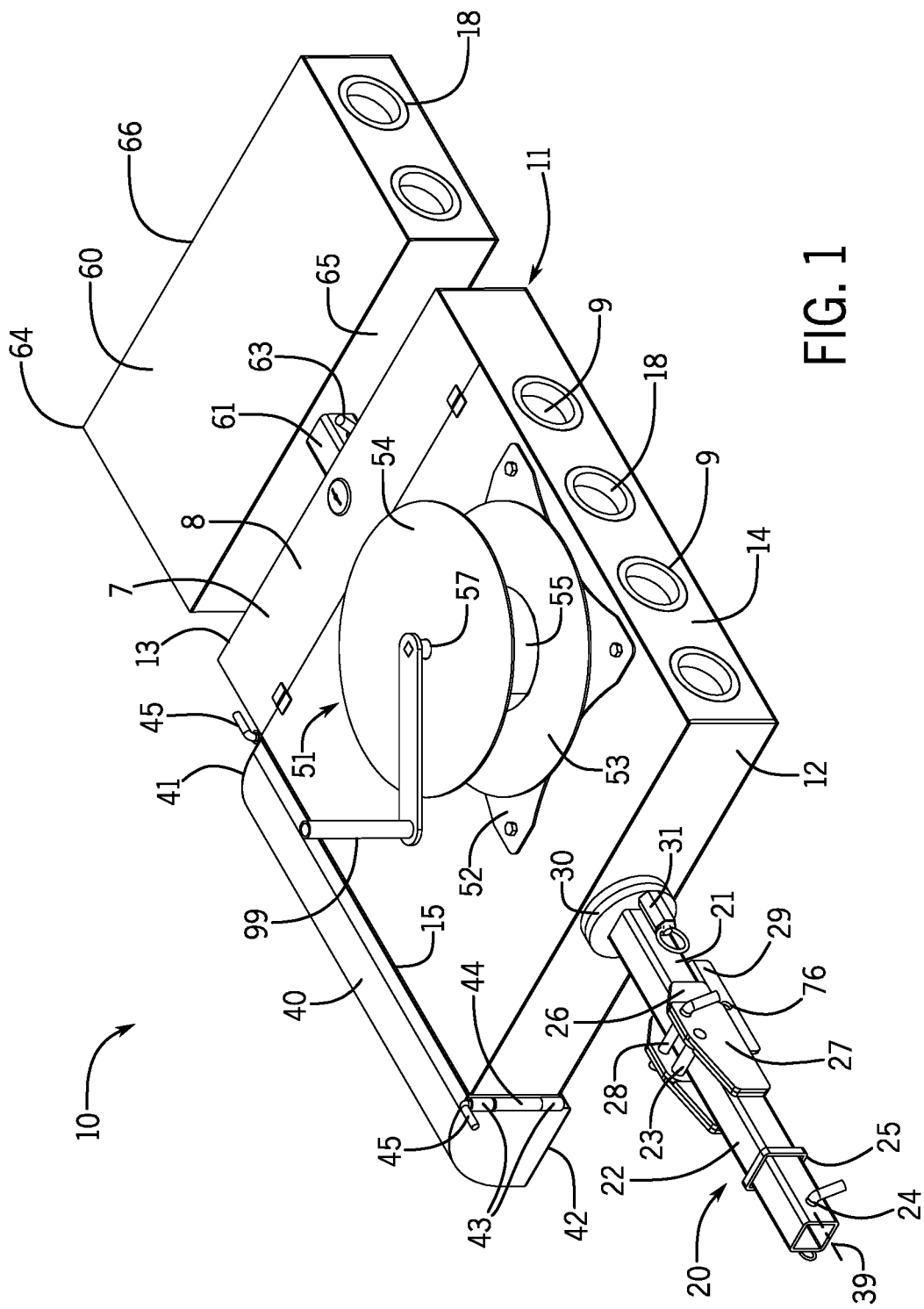
FIG. 1 shows a top perspective view of a hose nozzle test system of the present invention.

While there is described herein certain specific embodiments of the present invention, it will be manifest to those skilled in the art that various modifications may be made without departing from the spirit and scope of the underlying inventive concept and that the same is not limited to the particular forms herein described.

This invention provides a hose nozzle test system having a metal housing with a plurality of hose nozzles therein, preferably four hose nozzles. The housing has a first side for attachment of hoses to the hose nozzles and a second opposite side allowing water to exit the hose nozzles, without resistance at full force, to test for gallons per minute flow rate. The second side also allows attachment of a water diffuser having a strainer. The diffuser decreases water pressure to allow the capture of sediment that may come out of the piping. The diffuser provides a test that determines if the inside of a pipe is deteriorated enough to need replacing, based on the amount of rust and particles that come out of the pipe and are trapped in the strainer. The diffuser is attached rotatably on each end of the second side of the housing by hinges with removable pins. If a pin is removed from one hinge, the diffuser can be rotated with the other hinge away from the second side of the housing. This feature provides easy access to the interior of the diffuser and to the strainer.

Fire hoses are attached between the hose nozzle system and equipment to be tested (pump, hydrant, etc.). The hose nozzle system can attach to any commercial vehicle at a tow package. Attaching the hose nozzle system to the vehicle allows the technician to control the direction of the water discharge and take any required measurements without being subjected to the high pressure flowing water. When the hose nozzle system is attached to a vehicle at the hitch, and the hoses are attached to the valves on a water pump or fire hydrant, and to the nozzles of the hose nozzle system, the hoses are rendered very stable. The hose nozzle system in this configuration makes it safe to discharge water from a pump or hydrant under high pressure.

To allow for easier access to the rear of a vehicle and its truck bed (e.g. pickup truck), the hose nozzle system can include a hinged hitch system that will allow the device to fold up parallel to the tailgate when not in use. The hose nozzle system can also be completely removed from the vehicle by releasing it from the tow package and rolling it away on wheels which are reversibly attachable to the hose nozzle system.

Supplemental attachments for the hose nozzle system include: (1) a double wheel at the front end of the housing that will retract and release to allow the hose nozzle system to roll similar to a dolly; (2) a removable hose reel to roll up fire hoses on the device and detached for storage; (3) a diffuser with a screen that will catch sediment particles; and (4) an extension having additional hose nozzles for situations where more hose nozzles may be required, depending upon the size of the fire pump.

Figure 2:
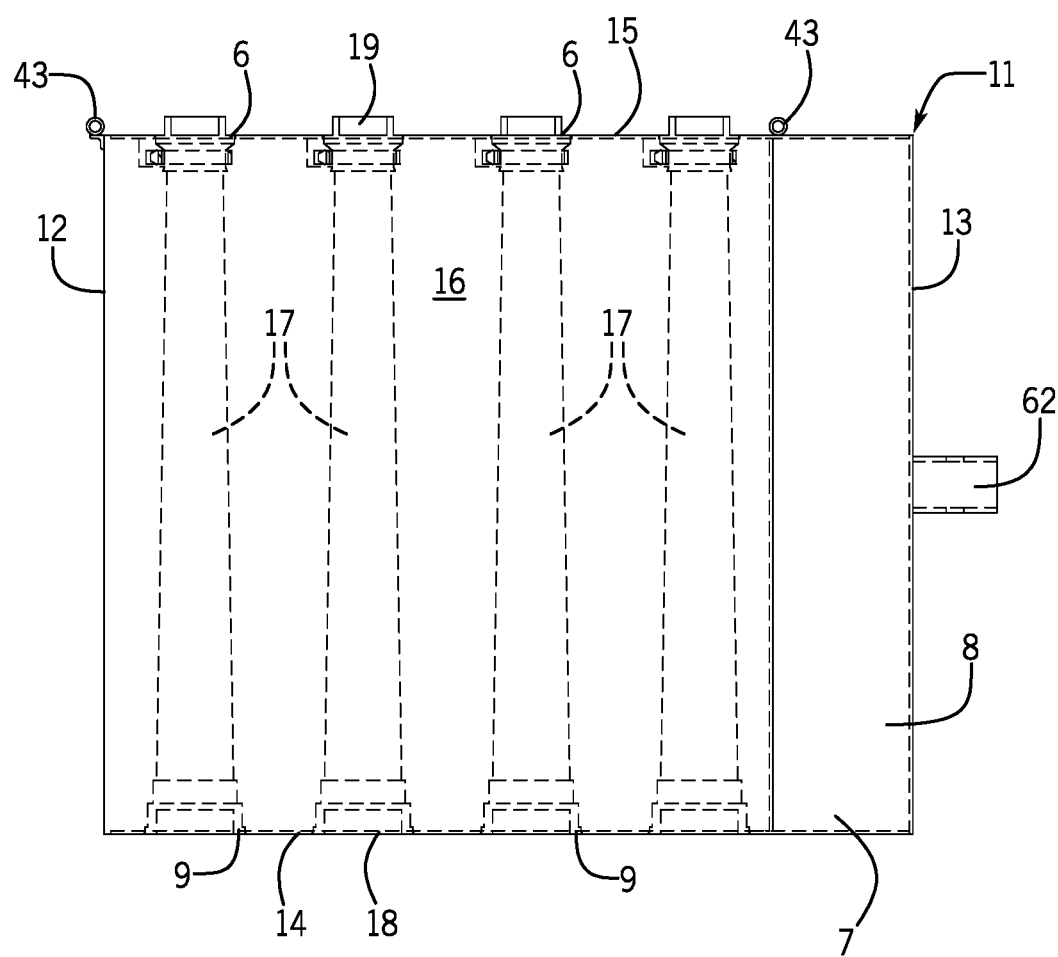
FIG. 2 shows a top view of the housing of the hose nozzle system with interior features shown in phantom.

FIG. 1 shows a top perspective view of a hose nozzle system 10 of the present invention having a housing 11, a front end 12, a rear end 13, a first side 14, and a second opposite side 15. FIG. 2 shows a top view of the housing 11 having an interior 16, further showing the placement of hose nozzles 17 in the interior 16. Each hose nozzle 17 has a first end 18 for the attachment of a hose 35 (see FIG. 3) and a second opposite end which is a tip 19 of the nozzle 17 for the discharge of water. The first side 14 has openings 9 to allow attachment of a hose 35 to the first ends 18 of the nozzle 17 (see FIGS. 3 and 4). The second opposite side 15 of the housing 11 has openings 6 which allow nozzle tips 19 to extend out of the housing 11 for the discharge of water (see FIG. 2). The front end 12 of the housing 11 has a male hitch 20 (see FIG. 1). The male hitch 20 has a first portion 21 which is attached to the front end 12 and a second portion 22 which is attached to the first portion 21 with a hinge pin 23. Hinge pin 23 allows the hose nozzle system 10 to be rotated from a horizontal position to a vertical position (see FIG. 4). The second portion 22 has a hole 24 for connecting the male hitch 20 to a female hitch 32 on a vehicle 34 (see FIGS. 3 and 4) by methods well known in the art. The second portion 22 can also have a slide stop 25 which limits the degree of insertion of the male hitch 20 into the female hitch 32. The housing 11 can have a storage compartment 8 for containing items such as tools and the like. The compartment 8 is shown at the rear end 13 of the hose nozzle system 10 and has a hinged door 7.

The first portion 21 has side brackets 26 which are mounted on hinge pin 23. The second portion 22 also has side brackets 27 which are attached rotatably to hinge pin 23. A removable locking pin 28 locks the side brackets 26 and 27 together so that first portion 21 cannot rotate relative to second portion 22. A wheel mounting bracket 29 is attached to the underside of the first portion 21. The first portion 21 may be mounted rotatably with a swivel mount 30 on front end 12 of the housing 11 which allows the housing 11 to rotate around the longitudinal axis of the housing 11. The longitudinal axis is shown by line 39. A pull-type locking pin 31 may be used to prevent the swivel mount 30 from rotating or to position the housing 11 at a specific degree of rotation.

The hose nozzle system 10 can have a supplemental hose nozzle housing attachment 60 which has a housing 64 similar to housing 11 and can have as many additional hose nozzles 17 as desired. In addition, the hose nozzle housing attachment 60 has a male hitch 61 on a front end 65 of hose nozzle housing attachment 60 for reversible attachment to a female hitch 62 mounted at the rear end 13 of the housing 11 (see FIG. 2). Male hitch 61 has a hole and removable locking pin 63 for attachment of male hitch 61 to female hitch 62 by methods well known in the art. A rear end of hose nozzle housing attachment 60 is shown at 66.

A hose reel 51 may be attached to the top of the housing 11 by means of a mounting bracket 52. The hose reel 51 is formed of a rear hose retaining member 53 and a front hose retaining member 54. The rear hose retaining member 53 is attached rotatably to the mounting bracket 52. The rear retaining member 53 and the front retaining member 54 are connected to each other by hose supports 55. The front retaining member 54 may have a centrally positioned ratchet drive 57 for rotating the hose reel 51 with a handle 99.

A diffuser 40 can be attached to the hose nozzle system 10 on the second opposite side 15 of housing 11, for diffusing water and trapping discharged sediment. The diffuser 40 has a top end 41 and a bottom end 42 which is open for draining. Hinges are formed on each end of the diffuser 40 by tubing members 44 which engage tubing members 43 on the second opposite side 15 of the housing 11. Removable pins 45 are inserted into the tubing members 43 and 44 to form the hinges.

Figure 3:
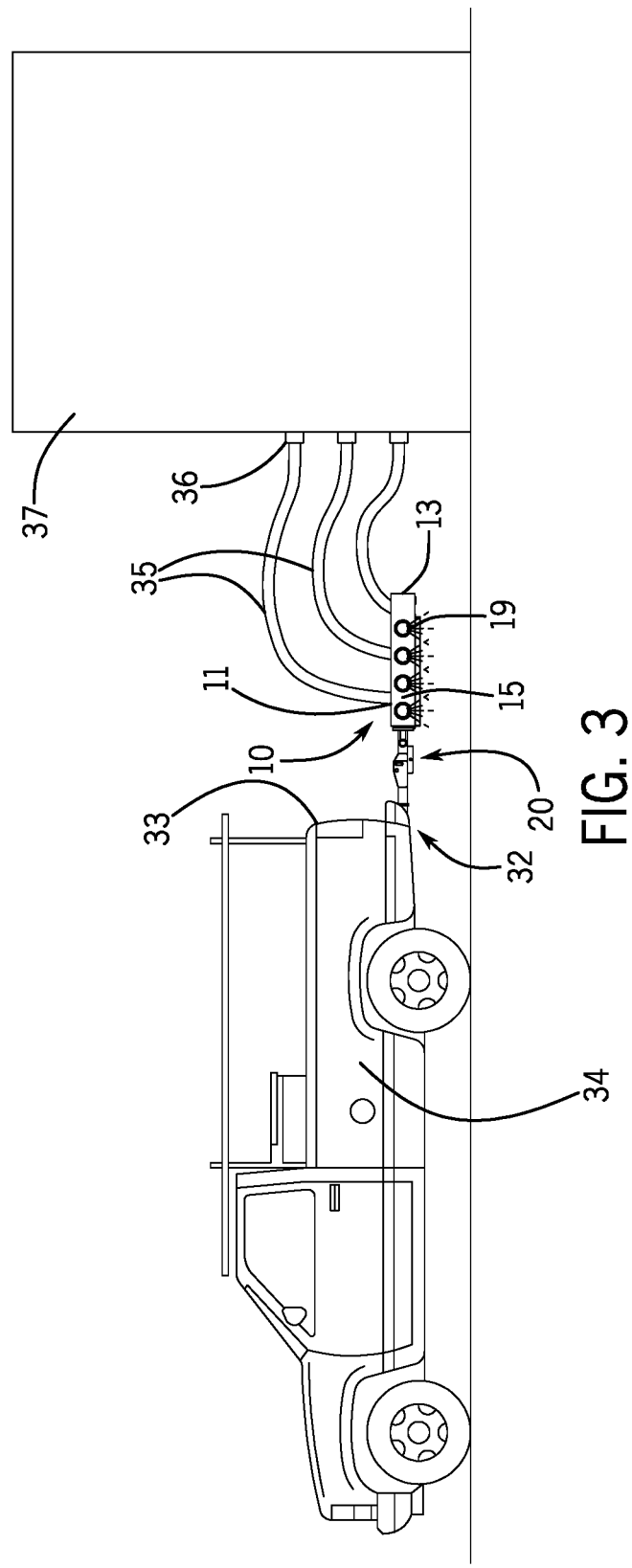
FIG. 3 shows a side view of the hose nozzle system in a horizontal orientation attached to a vehicle, with hoses attached at one end to the hose nozzles on a side of the housing and attached at an opposite end to a building having a fire pump within.

FIG. 3 shows a side view of the hose nozzle system 10 attached to a vehicle 34. Hoses 35 are shown attached to hose nozzles 17 at the first end 18 and to valves 36 from a water pump (not shown) usually contained in a building 37. A plurality of valves 36 in parallel can be attached to the main valve (not shown) of the water pump by methods well known in the art.

Figure 4:
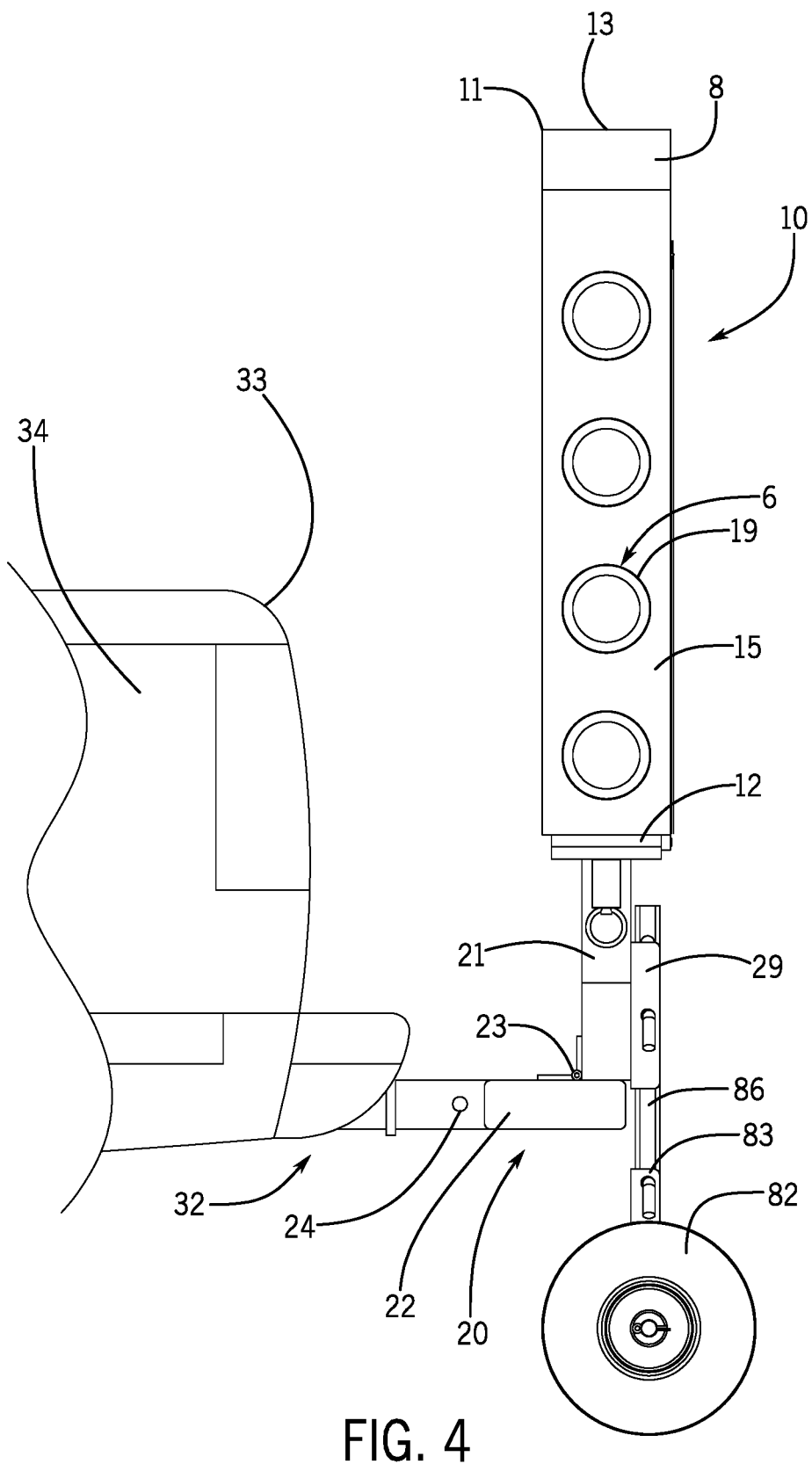
FIG. 4 shows a side view of the hose nozzle system and its male trailer hitch, with the hose nozzle system in a vertical position and with a double wheel attached for transporting the unit to a storage area or to another vehicle for use by another technician.

FIG. 4 shows a side view of the hose nozzle system 10 and its male trailer hitch 20, with the hose nozzle system 10 in a vertical position and with a double wheel 81 attached thereto for rolling the unit into storage or to another vehicle. The female trailer hitch 32 is shown attached at the rear end 33 of vehicle 34. The double wheel 81 has a wheel connecting bracket 83 with a connecting member 86 which is attached to the wheel mounting bracket 29 on the first portion 21 of the male hitch 20.

Figure 5:
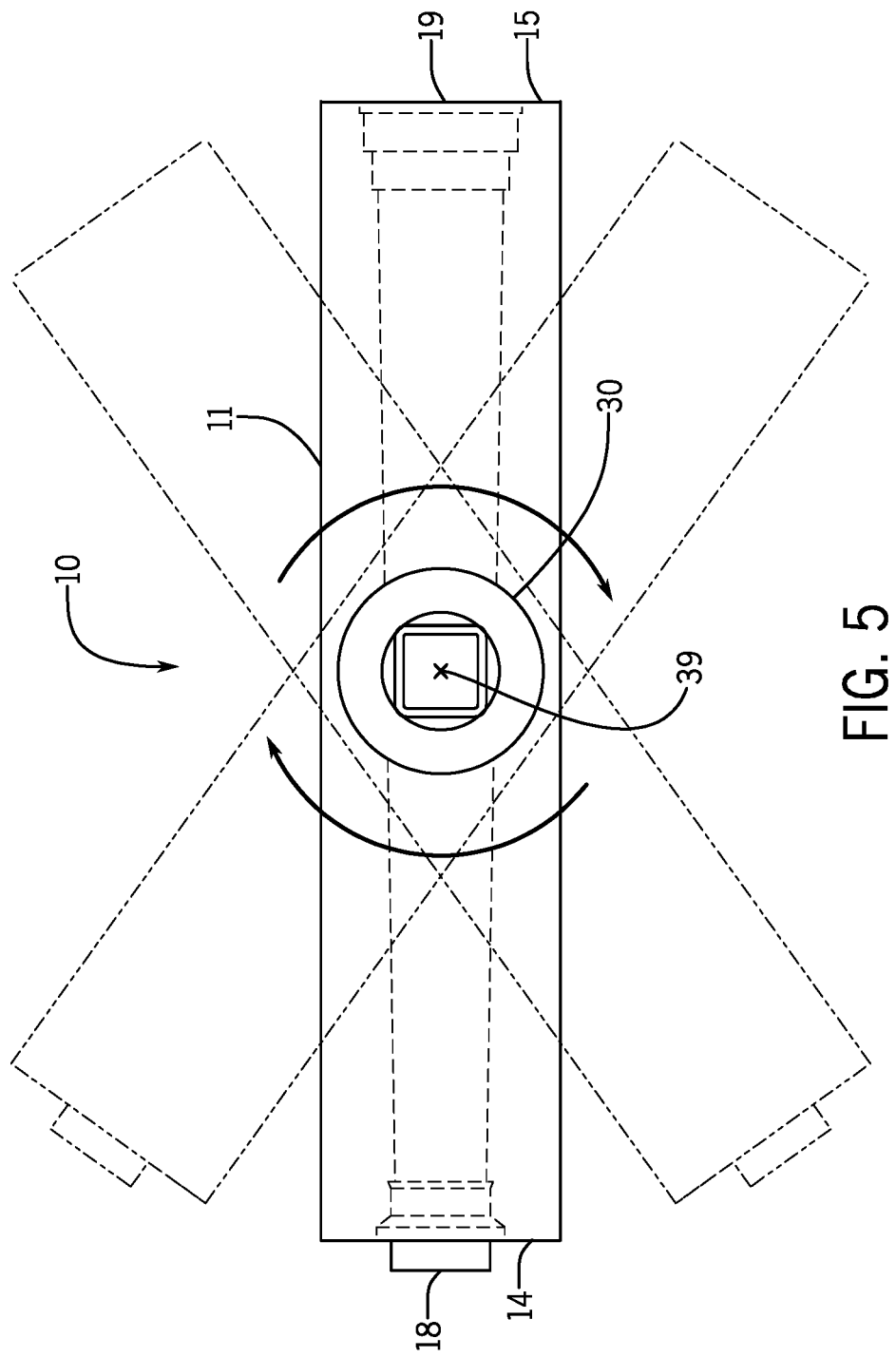
FIG. 5 shows the hose nozzle system having a swivel mechanism allowing the hose nozzle system to rotate around its longitudinal axis.

FIG. 5 illustrates that the hose nozzle system 10 may be rotated by means of a swivel mechanism 30. Swivel 30 allows the housing 11 to rotate around its longitudinal axis 39. Preferably, swivel 30 has a spring loaded mechanism, such as the pull pin 31, which allows the housing to rotate and be locked in place at, for example, 22.5 degrees, 45 degrees, and 90 degrees. This adjusting feature allows an operator to aim water in a desired direction for the best drainage, minimizing any damage to surrounding property.

Figure 6:
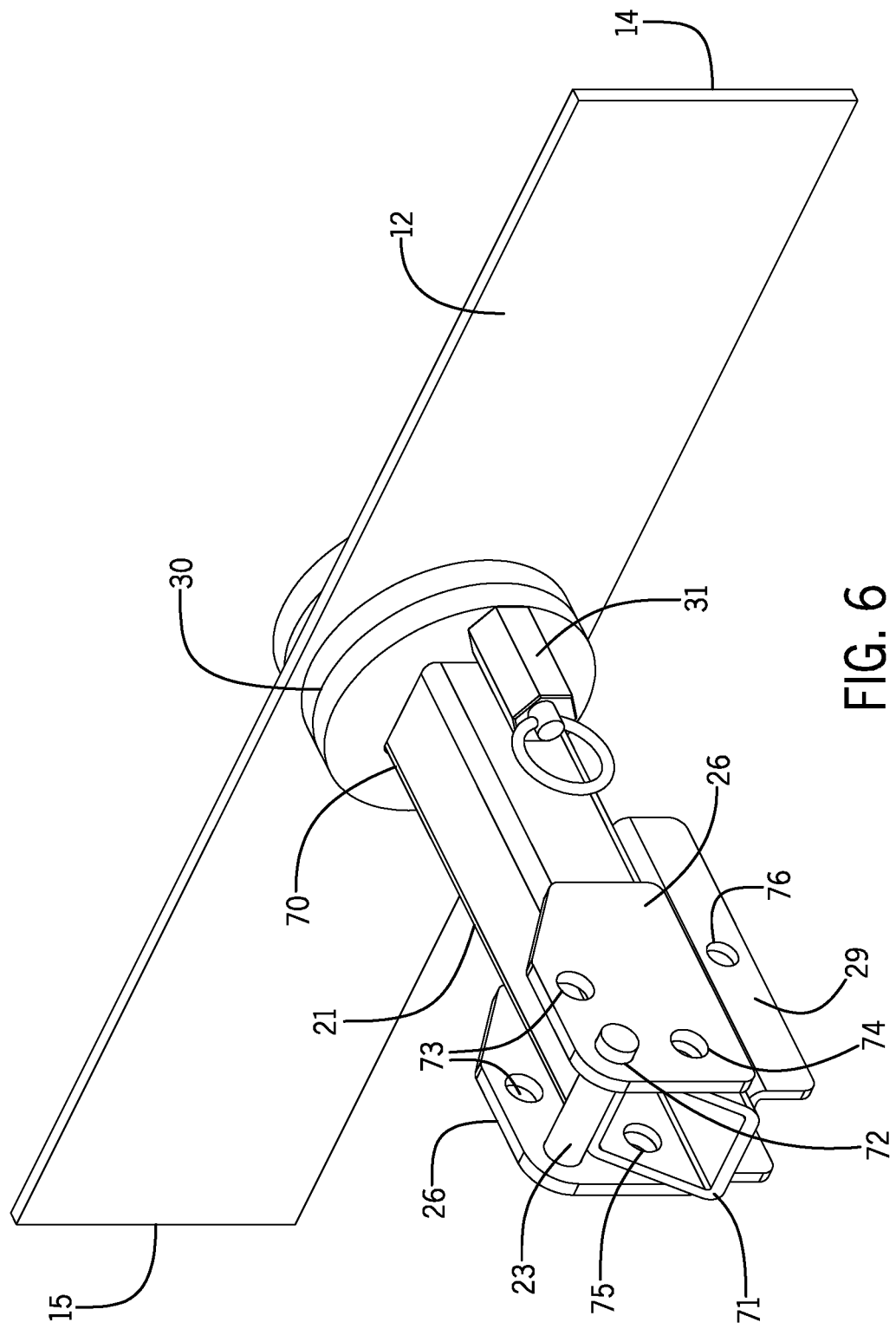
FIG. 6 shows a detailed top perspective view of a first portion of a male hitch attached to a front end of the housing.

FIG. 6 shows a detailed view of the first portion 21 of a male hitch 20 attached to the front end 12 of the housing 11. The first portion 21 has a front end 70 attached to the front end 12 of housing 11 and a second opposite end 71 to which the hinge 23 is fixed. Side brackets 26 have holes 72 for mounting onto hinge 23, holes 73 for the locking pin 28, and may have holes 74 for locking the side brackets 26 to the first portion 21 in holes 75 near the second opposite end 71. The wheel mounting bracket 29 has a hole 76 for connecting to a wheel connecting member 86 (see FIGS. 14 and 16).

Figure 7:
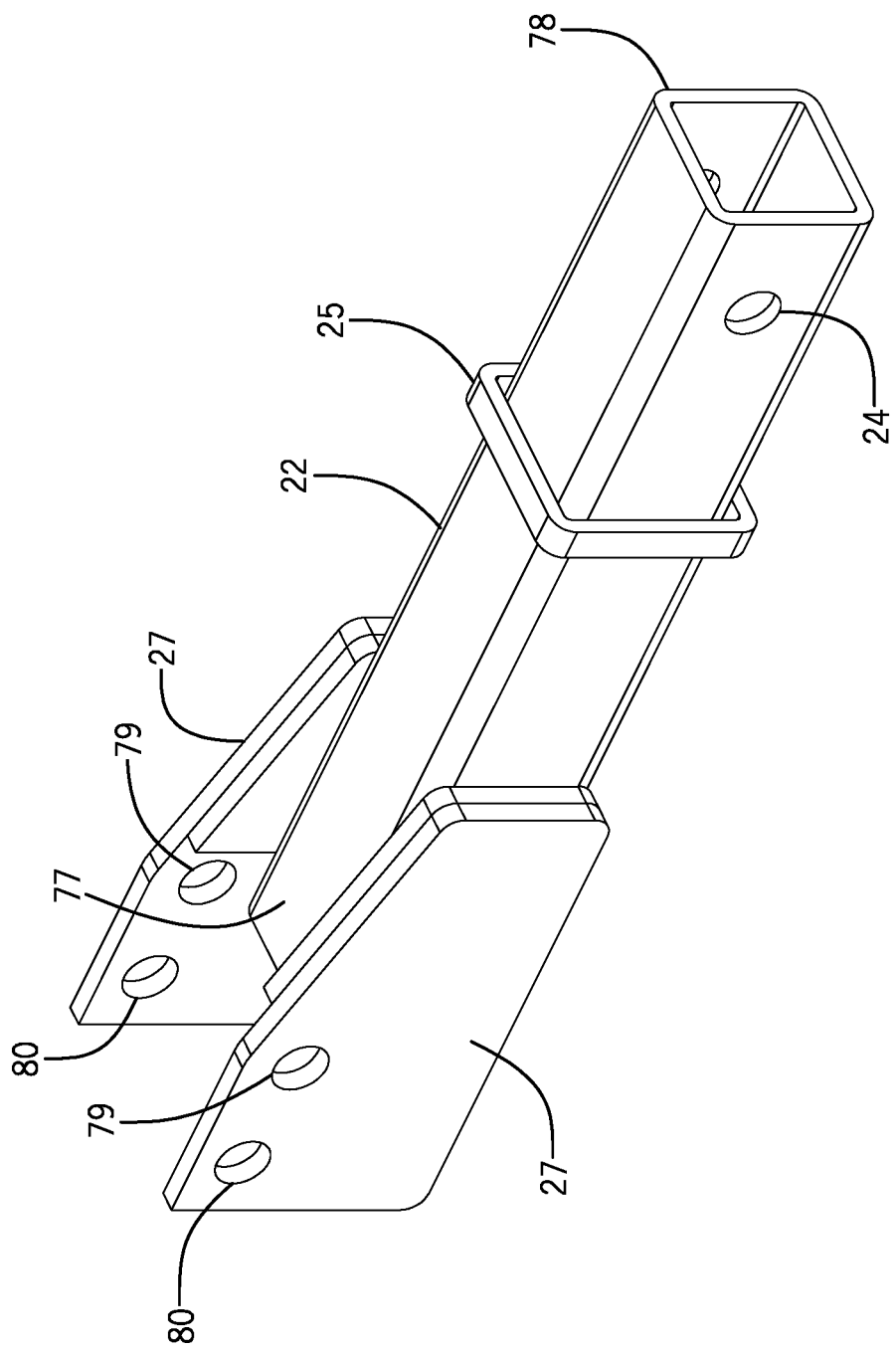
FIG. 7 shows a detailed top perspective view of a second portion of the male hitch configured for attachment to a female hitch of a vehicle.

FIG. 7 shows a detailed view of the second portion 22 of male hitch 20. The second portion has a front end 77 a second opposite end 78. Side brackets 27 have holes 79 for mounting onto hinge 23 and holes 80 for the locking pin 28. When the locking pin 28 is not inserted into holes 73 and 80, hinge 23 is rotatable in holes 79 and the hose nozzle system 10 can be rotated vertically (see FIG. 4). When the locking pin 28 is inserted into holes 73 and 80, hinge 23 is not rotatable in holes 79 and the hose nozzle system 10 remains in a horizontal position.

FIGS. 8 and 9 show features of the high pressure water flow diffuser 40 configured for attachment to the housing 11. The diffuser has a top end 41, a bottom end 42, a first side 46 and a second opposite side 47, defining an interior 48. The top end 41 is curved. The second opposite side 47 is open to receive water from the hose nozzles 17 and the bottom 42 is open for the drainage of water. The ends of the diffuser 40 on the second opposite side 47 have hollow tubing members 44 to form hinges. The bottom end 42 in the interior 48 has a shelf 49 to support a containment member (strainer) 50. The containment member 50 is a tray-like structure having an open mesh bottom 51 which traps debris and sediment but allows water to pass through out of the bottom end 42.

Figure 10:
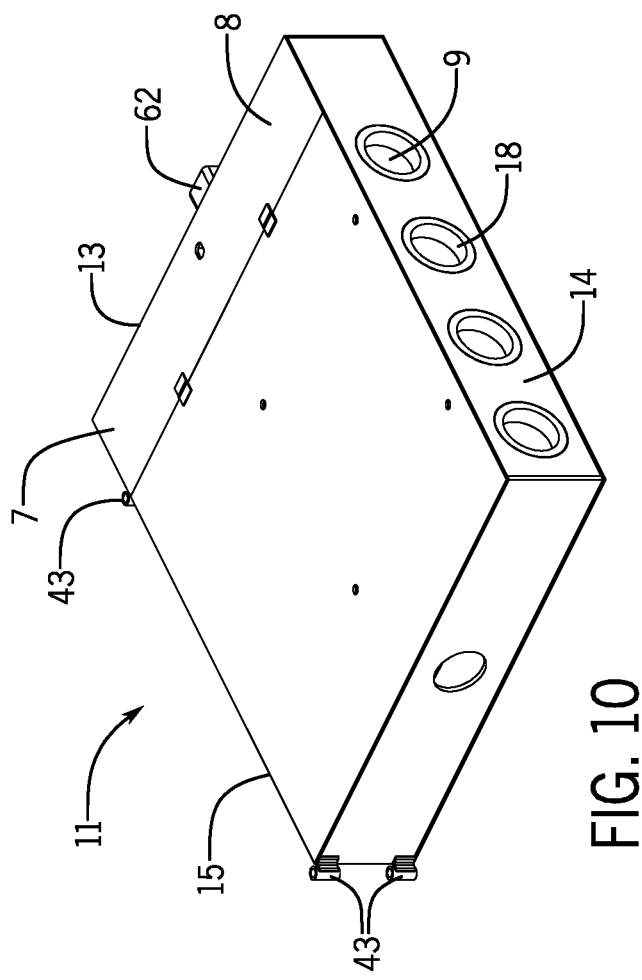
FIG. 10 shows the connecting hinge attachments on the side of the housing for attaching the high pressure water flow diffuser to the housing.

FIG. 10 shows hollow tubing members 43 on the second opposite side 15 of the housing 11 which are configured to fit above and below the hollow tubing members 44 at the ends of the second opposite side 47 of the diffuser 40. The tubing members 43 and 44 are joined with the locking pin 45 to create locking hinges (see FIG. 1). When one of the locking pins 45 is removed from the tubing members 43 and 44, the other locking pin 45 will act as a hinge to allow the diffuser 40 to swing towards or away from the second opposite side 15. This feature provides easy access to the containment member 50 in the interior 48. The diffuser 40 is, preferably, in the shape of one-fourth of a cylinder.

Figure 11:
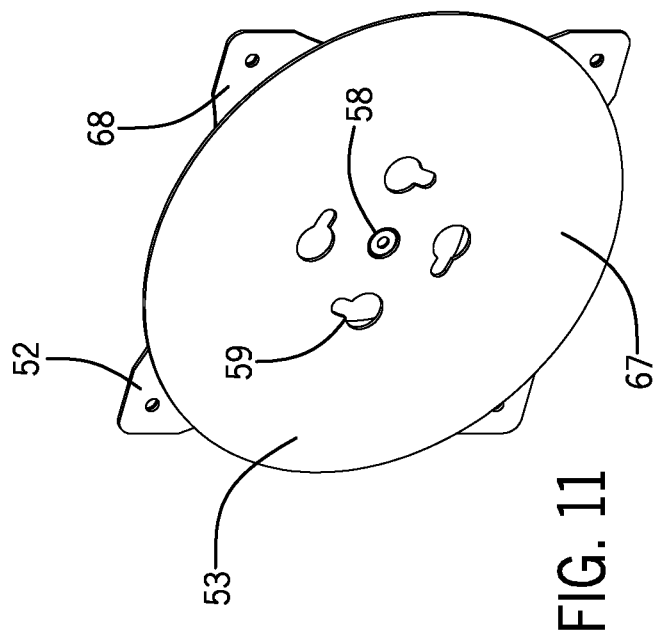
FIG. 11 shows a front perspective view of a hose reel mounting bracket and rear hose retaining member of a hose reel.
Figure 13:
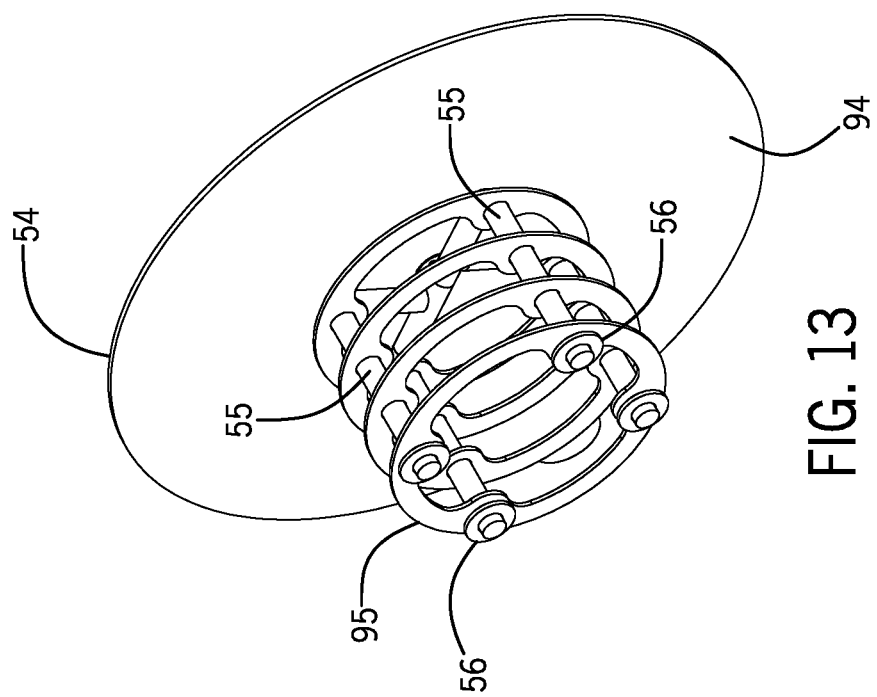
FIG. 13 shows a rear view of a front hose retaining member having hose support members with connecting tabs and hose support rings.
Figure 12:
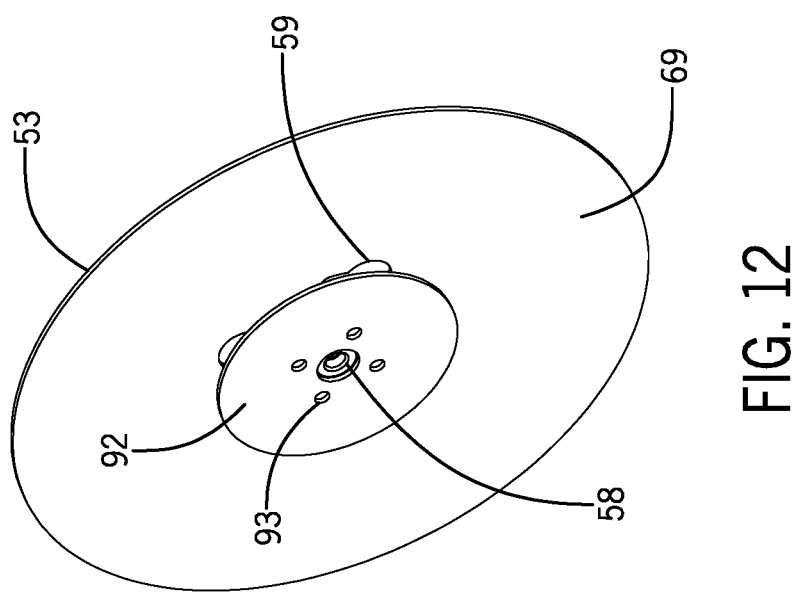
FIG. 12 shows a rear perspective view of the rear hose retaining member having a bearing mounting plate and bearing.

FIGS. 11-13 show features of the hose reel attachment 51. FIG. 11 shows a front surface 67 of the rear hose retainer member 53. The rear hose retainer member 53 is attached rotatably to a front surface 68 of hose reel mounting bracket 52. The hose reel mounting bracket 52 can be attached to any suitable place on the housing 11 of the hose nozzle system 10. The rear hose retainer member 53 is mounted on a bearing 58 and has a plurality of connecting slots 59 which connect the rear hose retainer member 53 to the front hose retainer member 54. FIG. 12 shows a rear surface 69 of the rear hose retainer member 53. The bearing 58 is positioned in a bearing mounting plate 92 on the rear surface 69. The bearing mounting plate 92 has holes 93 for attaching the bearing mounting plate 92 to the front surface 68 of the hose reel mounting bracket 52. FIG. 13 shows a rear surface 94 of the front hose retainer member 54 having hose support members 55. The hose support members 55 have connecting tabs 56 which connect the support members 55 to the connecting slots 59 in the rear hose retainer member 53. The front retainer member 54 also has a ratchet type drive assembly 57 for rotating the hose reel attachment 51 with a handle 99 (see FIG. 1) to wind up a hose on the hose support members 55. The hose support members 55 may also have circular supports 95 attached thereto to provide further support for holding a hose wound up on the support members 55.

Figure 15:
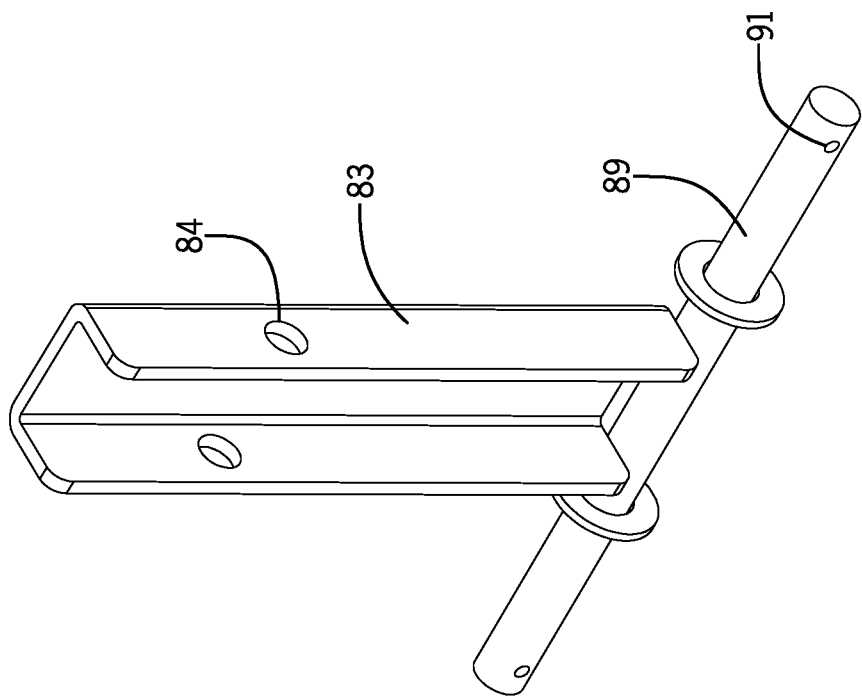
FIG. 15 shows a detailed perspective view of a wheel connecting bracket fixed to the axle of the double wheel.
Figure 14:
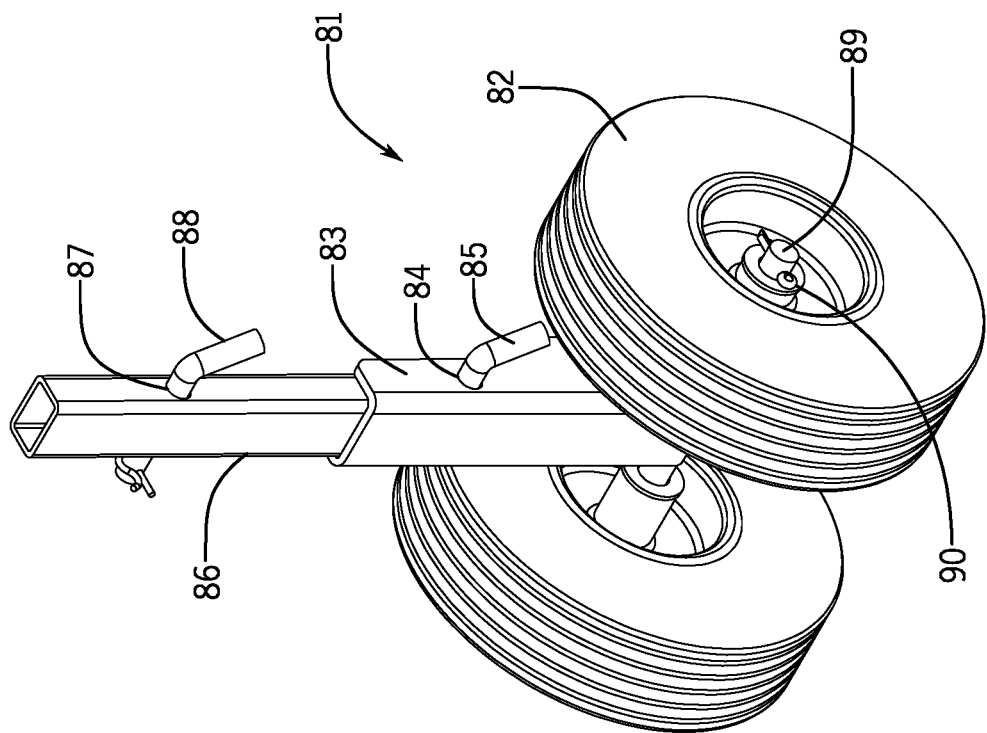
FIG. 14 shows a top perspective view of a double wheel for attachment to the first portion of the male hitch.
Figure 16:
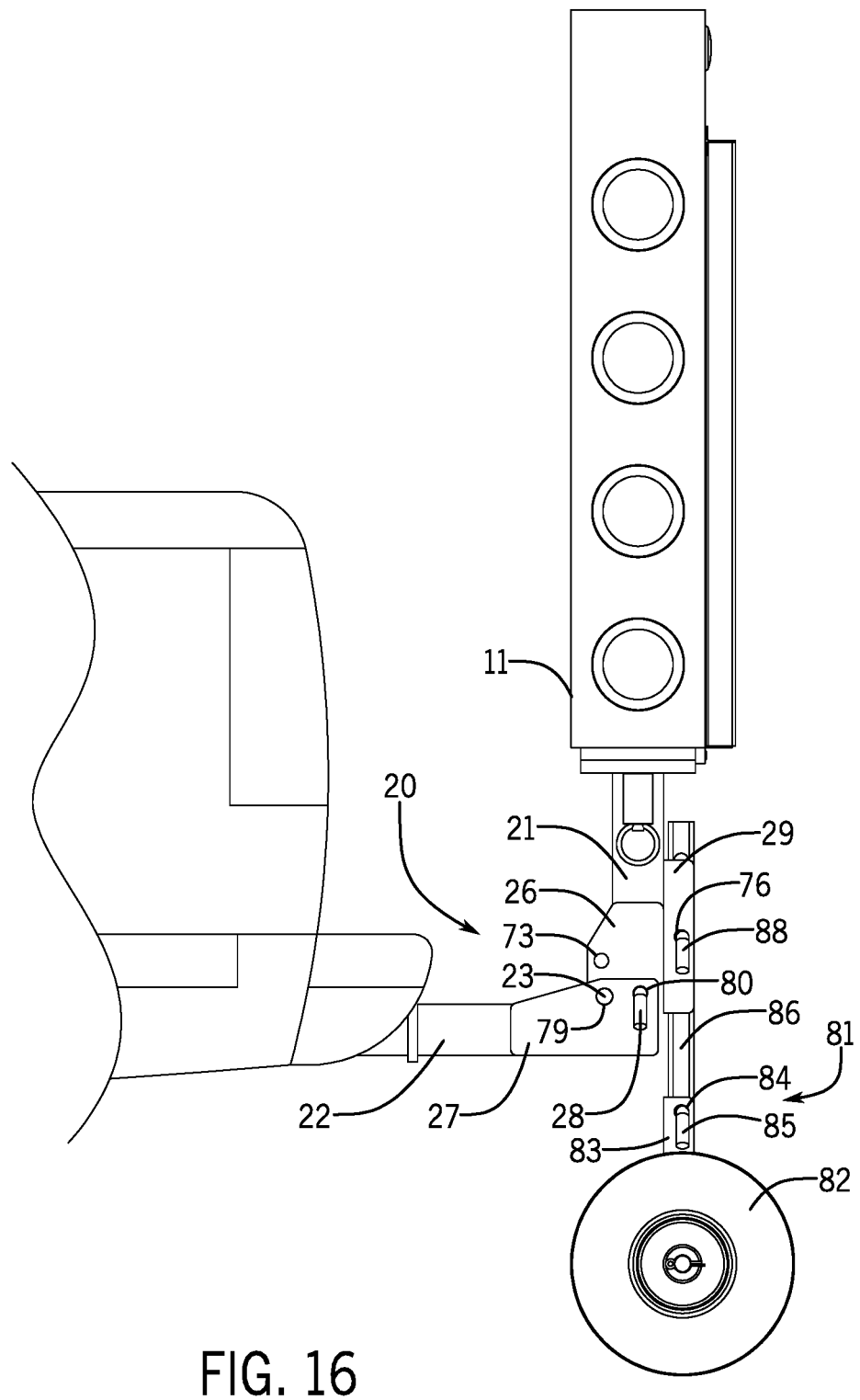
FIG. 16 illustrates the attachment of the double wheel to the first portion of the male hitch.

FIGS. 14 and 15 show the features of the double wheel attachment 81 for connecting to the first portion 21 of the male hitch 20. The double wheel attachment 81 has a pair of wheels 82 positioned on axle 89 and held in place with cotter pins 90 in holes 91. A wheel connecting bracket 83 is fixed to the axle 89 and a connecting member 86 is reversibly attached to the wheel connecting bracket 83 with a connecting pin 85 in hole 84 in the wheel connecting bracket 83. The connecting member 86 has a hole 87 with a pin 88 for connecting member 86 to the wheel mounting bracket 29 which is on the first portion 21 of male hitch 20. The connecting member 86 thereby attaches the wheel connecting bracket 83 to the wheel mounting bracket 29. FIG. 16 shows the details of connecting the double wheel attachment 81 to the wheel mounting bracket 29. The connecting member 86 is locked to the wheel mounting bracket 29 by pin 88 which passes through holes 76 of the wheel mounting bracket 29 and through the holes 87 of the connecting member 86. When the hitch 20 is rotated into a vertical position, holes 80 in the side brackets 27, holes 74 in side brackets 26, and holes 75 in the first portion of male hitch 20 are in alignment. Pin 28 (see FIG. 1) is then inserted through these holes to lock the hitch 20 in the vertical position for transportation.

The hose nozzle system of the present invention has a housing with a plurality of hose nozzles therein and a trailer hitch which can fold vertically. The trailer hitch may also rotate around the longitudinal axis of the housing. One or more wheels can be attached to the bottom of the housing unit. Attachments for the housing include a diffuser to trap sediment, a hose reel, and additional hose nozzles. The hoses are rendered very stable when the hose nozzle system is attached to a vehicle and the hoses are attached to valves on a water pump and to the nozzles of the hose nozzle system. The hose nozzle system in this configuration makes it safe to discharge water from a pump under high pressure.

The hose nozzle system can be used by fire protection technicians, fire pump manufacturers, those installing a fire pump, or fire department personnel who need the ability to flow water at a high pressure for a period of time. It can be used for any situation where water needs to be flowed at a high rate of pressure in a controlled manner. Examples include fire protection industry personnel who can use it to test fire pumps or firemen who can use it to test fire hydrants.

The foregoing description has been limited to specific embodiments of this invention. It will be apparent; however, that variations and modifications may be made by those skilled in the art to the disclosed embodiments of the invention, with the attainment of some of all of its advantages and without departing from the spirit and scope of the present invention. For example, the housing can be made of metal or plastic or a combination thereof and can be of any suitable size or shape. Any suitable type of nozzle can be used. The hose reel can be placed anywhere on the housing or can be maintained separate from the housing.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. A portable apparatus for testing high pressure water systems, said apparatus comprising:
    a) a housing having a housing top, a housing bottom, a housing front, a housing rear, a housing first side and an opposing housing second side;
    b) a plurality of conduits extending through said housing between said housing first side and said housing second side, each of said conduits having a conduit first end which opens at said housing first side and a conduit second end which opens at said housing second side, said conduit first end adapted to secure a water hose;
    c) a diffuser attached to said housing second side, said diffuser having a diffuser top, a diffuser bottom having an opening therethrough, a diffuser inner wall having an opening therethrough, a diffuser outer wall, a diffuser first end and an opposing diffuser second end, said diffuser hingedly attached to said housing at a first hinge wherein said diffuser first end is attached to said housing second side adjacent said housing rear with a removable first hinge pin, said diffuser hingedly attached to said housing at a second hinge wherein said diffuser second end is attached to said housing second side adjacent said housing front with a removable second hinge pin;
    d) a tray adapted to removably mount in an interior of said diffuser adjacent said diffuser bottom, said tray having an open mesh bottom;
    e) a swivel mount attached to said housing front, said swivel mount including an adjustable lockable rotating member;

f) a coupling member having a proximal member having a proximal member first end and a proximal member second end and a distal member having a distal member first end and a distal member second end, said proximal member first end secured to said swivel mount, said proximal member second end pivotably attached to said distal member first end, said distal member second end adapted to reversibly mount to a vehicle, said proximal member including a wheel mounting bracket; and g) a wheeled attachment adapted to reversibly connect to said wheel mounting bracket;

h) wherein each of said conduits is operable to receive water in said conduit first end and direct the water out said conduit second end and into said diffuser through the opening through said inner wall, wherein said diffuser is operable to direct the water through said open mesh bottom of said tray and out the opening through said diffuser bottom;

i) wherein said first hinge pin is operable to be removed such that said diffuser is attached to said housing only at said second hinge, wherein said diffuser is operable to pivot away from said housing at said second hinge when said first hinge pin is removed and thereby allow access to said conduit second end of each of said conduits and to said interior of said diffuser;

j) wherein said second hinge pin is operable to be removed such that said diffuser is attached to said housing only at said first hinge, wherein said diffuser is operable to pivot away from said housing at said first hinge when said second hinge pin is removed and thereby allow access to said conduit second end of each of said conduits and to said interior of said diffuser;

k) wherein said adjustable lockable rotating member allows said housing to be rotated relative to said coupling member, wherein said housing is operable to be rotated around a longitudinal axis of said housing so that water exiting said housing can be directed as desired, wherein said housing is operable to be rotated from 0 to 90 degrees relative to said coupling member;

l) wherein said proximal member is operable to pivot 90 degrees from a horizontal position to a vertical position relative to said distal member, wherein said housing is operable to pivot with said proximal member from a horizontal orientation to a vertical orientation relative to said distal member;

m) wherein said wheeled attachment is operable to reversibly connect to said wheel mounting bracket when said proximal member is in said vertical position.

2. A portable apparatus for testing high pressure water systems, said apparatus comprising:
a) a housing having a housing top, a housing bottom, a housing front, a housing rear, a housing first side and an opposing housing second side;
b) a conduit extending through said housing between said housing first side and said housing second side, said conduit having a conduit first end which opens at said housing first side and a conduit second end which opens at said housing second side, said conduit first end adapted to secure a water hose;
c) a swivel mount attached to said housing front, said swivel mount including an adjustable lockable rotating member; and
d) a coupling member having a proximal member having a proximal member first end and a proximal member second end and a distal member having a distal member first end and a distal member second end, said proximal member first end secured to said swivel mount, said proximal member second end pivotably attached to said distal member first end, said distal member second end adapted to reversibly mount to a vehicle;
e) wherein said conduit is operable to receive water in said conduit first end and direct the water out said conduit second end;
f) wherein said adjustable lockable rotating member allows said housing to be rotated relative to said coupling member, wherein said housing is operable to be rotated around a longitudinal axis of said housing so that water exiting said housing can be directed as desired, wherein said housing is operable to be rotated from 0 to 90 degrees relative to said coupling member;
g) wherein said proximal member is operable to pivot 90 degrees from a horizontal position to a vertical position relative to said distal member, wherein said housing is operable to pivot with said proximal member from a horizontal orientation to a vertical orientation relative to said distal member.

3. An apparatus according to claim 2, further comprising a diffuser attached to said housing second side, said diffuser having a diffuser top, a diffuser bottom having an opening therethrough, a diffuser inner wall having an opening therethrough, a diffuser outer wall, a diffuser first end and an opposing diffuser second end, said diffuser hingedly attached to said housing at a first hinge wherein said diffuser first end is attached to said housing second side adjacent said housing rear with a removable first hinge pin, said diffuser hingedly attached to said housing at a second hinge wherein said diffuser second end is attached to said housing second side adjacent said housing front with a removable second hinge pin.

4. An apparatus according to claim 3, further comprising a tray adapted to removably mount in an interior of said diffuser adjacent said diffuser bottom, said tray having an open mesh bottom, wherein said conduit is operable to direct the water out said conduit second end and into said diffuser through the opening through said inner wall, wherein said diffuser is operable to direct the water through said open mesh bottom of said tray and out the opening through said diffuser bottom.

5. An apparatus according to claim 3, wherein said first hinge pin is operable to be removed such that said diffuser is attached to said housing only at said second hinge, wherein said diffuser is operable to pivot away from said housing at said second hinge when said first hinge pin is removed and thereby allow access to said conduit second end and to said interior of said diffuser.

6. An apparatus according to claim 5, wherein said second hinge pin is operable to be removed such that said diffuser is attached to said housing only at said first hinge, wherein said diffuser is operable to pivot away from said housing at said first hinge when said second hinge pin is removed and thereby allow access to said conduit second end and to said interior of said diffuser.

7. An apparatus according to claim 2, further comprising a wheeled attachment adapted to reversibly connect to a wheel mounting bracket on said proximal member, wherein said wheeled attachment is operable to reversibly connect to said wheel mounting bracket when said proximal member is in said vertical position.

8. A portable apparatus for testing high pressure water systems, said apparatus comprising:
a) a housing having a housing top, a housing bottom, a housing front, a housing rear, a housing first side and an opposing housing second side;

b) a conduit extending through said housing between said housing first side and said housing second side, said conduit having a conduit first end which opens at said housing first side and a conduit second end which opens at said housing second side, said conduit first end adapted to secure a water hose; and c) a diffuser attached to said housing second side, said diffuser having a diffuser top, a diffuser bottom having an opening therethrough, a diffuser inner wall having an opening therethrough, a diffuser outer wall, a diffuser first end and an opposing diffuser second end, said diffuser hingedly attached to said housing at a first hinge wherein said diffuser first end is attached to said housing second side adjacent said housing rear with a removable first hinge pin, said diffuser hingedly attached to said housing at a second hinge wherein said diffuser second end is attached to said housing second side adjacent said housing front with a removable second hinge pin;

d) wherein said conduit is operable to receive water in said conduit first end and direct the water out said conduit second end and into said diffuser through the opening through said inner wall;

e) wherein said first hinge pin is operable to be removed such that said diffuser is attached to said housing only at said second hinge, wherein said diffuser is operable to pivot away from said housing at said second hinge when said first hinge pin is removed and thereby allow access to said conduit second end and to said interior of said diffuser;

f) wherein said second hinge pin is operable to be removed such that said diffuser is attached to said housing only at said first hinge, wherein said diffuser is operable to pivot away from said housing at said first hinge when said second hinge pin is removed and thereby allow access to said conduit second end and to said interior of said diffuser.

9. An apparatus according to claim 8, further comprising a tray adapted to removably mount in an interior of said diffuser adjacent said diffuser bottom, said tray having an open mesh bottom, wherein said diffuser is operable to direct the water through said open mesh bottom of said tray and out the opening through said diffuser bottom.

10. An apparatus according to claim 8, further comprising:
a) a swivel mount attached to said housing front, said swivel mount including an adjustable lockable rotating member; and
b) a coupling member having a proximal member having a proximal member first end and a proximal member second end and a distal member having a distal member first end and a distal member second end, said proximal member first end secured to said swivel mount, said proximal member second end pivotably attached to said distal member first end, said distal member second end adapted to reversibly mount to a vehicle.

11. An apparatus according to claim 10, wherein said adjustable lockable rotating member allows said housing to be rotated relative to said coupling member, wherein said housing is operable to be rotated around a longitudinal axis of said housing so that water exiting said housing can be directed as desired, wherein said housing is operable to be rotated from 0 to 90 degrees relative to said coupling member.

12. An apparatus according to claim 10, wherein said proximal member is operable to pivot 90 degrees from a horizontal position to a vertical position relative to said distal member, wherein said housing is operable to pivot with said proximal member from a horizontal orientation to a vertical orientation relative to said distal member.

13. An apparatus according to claim 12, further comprising a wheeled attachment adapted to reversibly connect to a wheel mounting bracket on said proximal member, wherein said wheeled attachment is operable to reversibly connect to said wheel mounting bracket when said proximal member is in said vertical position.

14. A portable apparatus for testing water systems, said apparatus comprising:
a) a housing having a housing top, a housing bottom, a housing front, a housing rear, a housing first side and an opposing housing second side;
b) a conduit extending through said housing between said housing first side and said housing second side, said conduit having a conduit first end which opens at said housing first side and a conduit second end which opens at said housing second side, said conduit first end adapted to secure a water hose;
c) a coupling member having a proximal member having a proximal member first end and a proximal member second end and a distal member having a distal member first end and a distal member second end, said proximal member first end secured to said housing front, said proximal member second end pivotably attached to said distal member first end, said distal member second end adapted to reversibly mount to a vehicle, said proximal member including a wheel mounting bracket;
d) a swivel mount attached to said housing front, said proximal member first end secured to said swivel mount, said swivel mount including an adjustable lockable rotating member; and
e) a wheeled attachment adapted to reversibly connect to said wheel mounting bracket;
f) wherein said conduit is operable to receive water in said conduit first end and direct the water out said conduit second end;
g) wherein said proximal member is operable to pivot 90 degrees from a horizontal position to a vertical position relative to said distal member, wherein said housing is operable to pivot with said proximal member from a horizontal orientation to a vertical orientation relative to said distal member;
h) wherein said wheeled attachment is operable to reversibly connect to said wheel mounting bracket when said proximal member is in said vertical position;
i) wherein said adjustable lockable rotating member allows said housing to be rotated relative to said coupling member, wherein said housing is operable to be rotated around a longitudinal axis of said housing so that water exiting said housing can be directed as desired, wherein said housing is operable to be rotated from 0 to 90 degrees relative to said coupling member.

15. A portable apparatus for testing high pressure water systems, said apparatus comprising:
a) a housing having a housing top, a housing bottom, a housing front, a housing rear, a housing first side and an opposing housing second side;
b) a diffuser attached to said housing second side, said diffuser having a diffuser top, a diffuser bottom having an opening therethrough, a diffuser inner wall having an opening therethrough, a diffuser outer wall, a diffuser first end and an opposing diffuser second end, said diffuser hingedly attached to said housing at a first hinge wherein said diffuser first end is attached to said housing second side adjacent said housing rear with a removable first hinge pin, said diffuser hingedly attached to said housing at a second hinge wherein said diffuser second end is attached to said housing second side adjacent said housing front with a removable second hinge pin;

c) a conduit extending through said housing between said housing first side and said housing second side, said conduit having a conduit first end which opens at said housing first side and a conduit second end which opens at said housing second side, said conduit first end adapted to secure a water hose;

d) a coupling member having a proximal member having a proximal member first end and a proximal member second end and a distal member having a distal member first end and a distal member second end, said proximal member first end secured to said housing front, said proximal member second end pivotably attached to said distal member first end, said distal member second end adapted to reversibly mount to a vehicle, said proximal member including a wheel mounting bracket; and e) a wheeled attachment adapted to reversibly connect to said wheel mounting bracket;

f) wherein said conduit is operable to receive water in said conduit first end and direct the water out said conduit second end;

g) wherein said proximal member is operable to pivot 90 degrees from a horizontal position to a vertical position relative to said distal member, wherein said housing is operable to pivot with said proximal member from a horizontal orientation to a vertical orientation relative to said distal member;

h) wherein said wheeled attachment is operable to reversibly connect to said wheel mounting bracket when said proximal member is in said vertical position.

16. An apparatus according to claim 15, further comprising a tray adapted to removably mount in an interior of said diffuser adjacent said diffuser bottom, said tray having an open mesh bottom, wherein said conduit is operable to direct the water out said conduit second end and into said diffuser through the opening through said inner wall, wherein said diffuser is operable to direct the water through said open mesh bottom of said tray and out the opening through said diffuser bottom.

17. An apparatus according to claim 15, wherein said first hinge pin is operable to be removed such that said diffuser is attached to said housing only at said second hinge, wherein said diffuser is operable to pivot away from said housing at said second hinge when said first hinge pin is removed and thereby allow access to said conduit second end and to said interior of said diffuser.

18. An apparatus according to claim 17, wherein said second hinge pin is operable to be removed such that said diffuser is attached to said housing only at said first hinge, wherein said diffuser is operable to pivot away from said housing at said first hinge when said second hinge pin is removed and thereby allow access to said conduit second end and to said interior of said diffuser.

* * * * *